United States Patent [19]

Peters et al.

[11] 3,724,638
[45] Apr. 3, 1973

[54] SAMPLE CONVEYOR AND TRANSPORT SYSTEM

[75] Inventors: Joseph C. Peters; Louis J. Cerulo, both of Marlborough, Mass.

[73] Assignee: Damon Corporation, Needham Heights, Mass.

[22] Filed: Oct. 22, 1971

[21] Appl. No.: 191,612

[52] U.S. Cl. ................................... 198/24, 198/45
[51] Int. Cl. .................................... B65g 47/06
[58] Field of Search ........ 198/75, 24; 221/11, 76, 97, 221/197; 312/97; 271/DIG. 10, 3, 4, 7, 61

[56] References Cited

UNITED STATES PATENTS

| | | | |
|---|---|---|---|
| 2,608,284 | 8/1952 | Fahey | 198/75 X |
| 3,199,651 | 8/1965 | Lobick | 198/24 |
| 3,658,321 | 4/1972 | Gnage | 271/61 |

*Primary Examiner*—Harvey C. Hornsby
*Assistant Examiner*—James W. Miller
*Attorney*—John A. Lahive, Jr.

[57] ABSTRACT

A conveyor and transport system for supplying a succession of racks, each containing a number of sample vials to an automatic liquid sampler, where the conveyor includes an input conveyor section, a belt transport conveyor section and an output conveyor section. The belt transport conveyor carries the racks from the input conveyor to a position under the sampling probe and thereafter to an output conveyor. The input conveyor receives a drawer containing an ordered row of racks and provides for gravity feed of these racks to a position on the conveyor adjacent to the transport conveyor, a pusher element being actuated to transfer each rack from this position on the input conveyor onto the transport conveyor. The transport conveyor discharges the racks onto a drawer positioned on the output conveyor which, the latter including a series of freely rotatable rollers which support racks delivered onto the output conveyor. An air acutated pusher element responds to the delivery of a rack onto the output conveyor by driving that rack toward the rear of the conveyor, thereby filling the output drawer with a row of already processed racks. When this drawer is filled a sensing element provides a signal stopping the conveyor until a new empty output drawer is substituted on the output for the original one.

7 Claims, 6 Drawing Figures

SAMPLE CONVEYOR AND TRANSPORT SYSTEM

FIELD OF THE INVENTION

This invention relates in general to machines for the automatic analysis of a plurality of liquid samples and more particularly to a conveyor and transport apparatus for storing a plurality of racks each holding a number of liquid samples and for supplying these racks automatically, one at a time to an input sampling probe of an analysis machine and thereafter storing the racks upon completion of the sampler.

BACKGROUND OF THE INVENTION

Machines for performing automatic analyses on each of a plurality of liquid samples supplied to it in a series of test tubes are well known in the art. Typically these machines include an input sampling probe for aspirating a liquid sample from each test tube presented to it in a series and supplying that aspirated sample to an automated chemical analysis system to ascertain the concentration of various selected constituents in the aspirated sample. Such machines have found particularly wide use in biological applications, most particularly in the automatic analyses of blood samples. One such machine is described in pending application Ser. No. 105,805 filed Jan. 12, 1972, assigned to the assignee of this application.

In many instances these machines are used in laboratories which handle a very large number of samples on a routine basis and it is important that the machine be arranged not only to process the samples as rapidly as possible, but also for convenient handling of a relatively large number of sample vials. In many such laboratories, the sample vials themselves have arrived individually at the laboratory from doctor's offices or the like. Any conveyor and transport mechanism for supplying these samples to the input sampling probe of the analysis machine must, therefore, be capable of receiving the sample vials in individual form and yet must provide transport in the automatic cycle in a sufficiently organized array to provide for easy and trouble free operation of the machine at relatively high speeds.

SUMMARY OF THE INVENTION

Broadly speaking, in the transport and conveyor system of the present invention the individual sample vials are loaded into a series of racks, each containing a number of vials, for example ten, with the racks and the vials in the proper orientation for sampling and automatic identification as they are processed through the machine. A drawer formed of a generally rectangular frame arranged to hold a plurality, typically ten, of these racks in an ordered row, is used for storage prior to analysis and for insertion of the entire row onto the conveyor system of the analysis machine for sequential supply to the sampling probe. The conveyor system of the machine includes a gravity feed input conveyor constructed to receive the drawer with the racks of the vials on it and to allow these racks to be moved sequentially from the far end of the drawer to the front. A belt conveyor is positioned adjacent to the front end of this input conveyor, generally at right angles to the direction of travel on the input conveyor to receive the frontmost rack from the drawer, transport it underneath the sampling probe where it is sampled, and thereafter deliver it to an output conveyor. The output conveyor is positioned at the far end of the belt conveyor and extends generally parallel to the input conveyor. It contains an empty drawer generally similar to that used on the input conveyor. The racks delivered from the output of the belt conveyor are accumulated and stored in this drawer. As each rack is delivered to the drawer a mechanical pushing element drives it away from the front of the drawer along the output conveyor until a full complement of racks has been stored in the drawer. When this occurs the drawer is removed from the output conveyor for storage or other disposition of the racks. Each drawer is designed so that, in position, it cooperates with the conveyor to allow the sample racks, supported on the drawer frame until it is positioned on the conveyor, to be supported by the conveyor for movement either toward the front of the drawer, on the input conveyor or toward the rear of the drawer on the output conveyor. Appropriately positioned sensing elements, responsive to the presence of racks in particular positions provide signals for the energization of push members to drive the racks from the input conveyor onto the belt conveyor and from the frontmost position in the drawer on the output conveyor toward the rear of that drawer.

The overall arrangement is one found convenient for handling of the vials in terms of numbers of racks, each containing numbers of vials and which provides efficient, trouble-free input and output conveyors while utilizing a very simple and economical structure for the drawers, allowing them to be used both to control the array of racks on the conveyors and as a storage magazine for the racks.

DESCRIPTION OF PREFERRED EMBODIMENT

Figure 1:
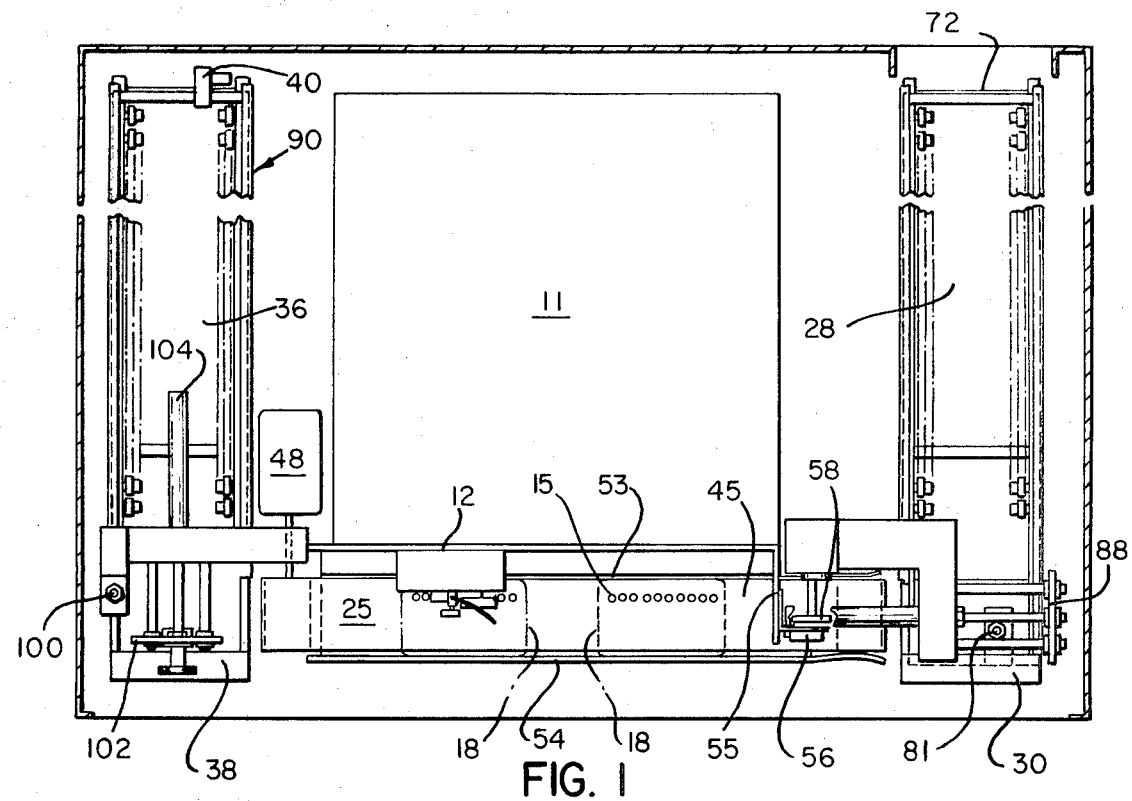
FIG. 1 is a simplified top view of the conveyor and transport apparatus of this invention.
Figure 2:
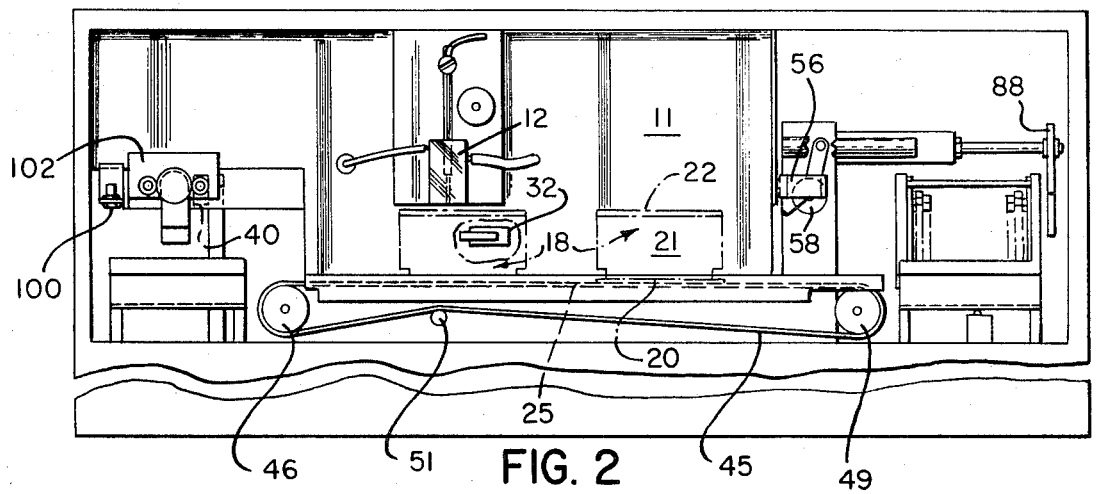
FIG. 2 is a front view of the apparatus illustrated in FIG. 1.

In FIGS. 1 and 2 there is illustrated in simplified form the transport and conveyor system of this invention for supplying racks containing sample vials from an input storage drawer to a sampling probe, which aspirates liquid from one sample vial at a time, the racks thereafter being transported to storage in another sample drawer. Referring now to FIGS. 1 and 2, a fluid analyzer shown generally at 11 has a sample probe 12 mounted on its front face for vertically reciprocable movement into and out of sample vials 15, when they are positioned beneath it. A number of sample vials 15 are contained in a row on a carriage or rack 18. The rack 18 is formed, typically of a hard plastic material, with a generally rectangular flat base plate 20 having a vertical support member 21 supporting a top shelf 22. The sample vials 15 are supported in a row of holes on one side of the top shelf 22.

A belt conveyor 25 transports the sample racks 18 along the front of the analyzer 11 into position under the sampler 12. As will be discussed in more detail below the racks 18 are loaded onto conveyor 25 from an input conveyor 28, which provides for gravity feed of each of a succession of racks 18 contained in a storage drawer 30, which is inserted onto the input conveyor 28. When the first sample container 15 within a rack 18 is positioned under the sampler 12 a sample sensing microswitch 32 detects the container in this position and provides an output signal which stops the movement of the belt conveyor 25. Upon completion of the sampling cycle, a signal is provided restarting the conveyor 25 and thereby moving the rack 18 toward the output conveyor 36. The next sample container 15 in the rack 18 will then be sensed by microswitch 32, again stopping the conveyor 25 until a sample cycle is completed for this container. When all of the sample vials 15 in a container 18 have been sampled the conveyor 25 deposits rack 18 onto the output conveyor 36. The conveyor 36 has positioned on it an output storage drawer 38, arranged to cooperate with the conveyor to allow a number of racks 18 to be stored on it. When the drawer is filled microswitch 40, at the rear of the output conveyor 36 detects this condition and provides an output signal stopping the belt conveyor 25. The drawer 38 is then removed for storage or other disposition of the racks and a new empty drawer 38 is inserted in its place. Similarly, when the input drawer 30 has been emptied, a new drawer containing a full array of racks 18 is inserted to provide for continued feed of the belt conveyor 25. While only a single rack 18 has been shown in place on the belt conveyor 25, it will be understood that a number of these racks may be transported in a substantially continuous train along the conveyor.

THE BELT CONVEYOR

The belt conveyor 25 is formed from a continuous conveyor belt 45, which is shown as having a rubber studded surface to provide for minimum slippage of a rack 18 as it is carried along the belt. The belt 45 is driven by a drive roller 46, in turn driven by motor 48, which is controlled to start and stop according to applied signals. An idler roller 49 is at the opposite end of the conveyor belt 45, near the input conveyor 28. A tensioning roller 51 provides tension on the belt 45 to prevent slippage. The conveyor has guide rails 53 and 54 along either side of it to maintain the alignment of the racks 18 as they proceed along it. At the input end of the conveyor belt 25 there is supported on a frame member 55 a sensing microswitch 56, which detects when each rack 18 has cleared the input conveyor 28. A hold down wheel 58 is mounted directly behind the microswitch 56 to press down on the top of a rack as it passes from the input conveyor 28 onto the belt conveyor 25 to assure that it is firmly positioned on the belting 45.

THE INPUT CONVEYOR

Figure 3:
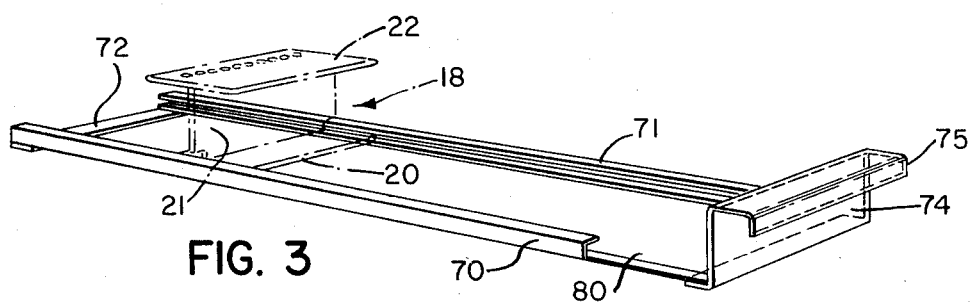
FIG. 3 is a perspective view of a sample rack drawer useful in the conveyor and transport mechanism of this invention.
Figure 4:
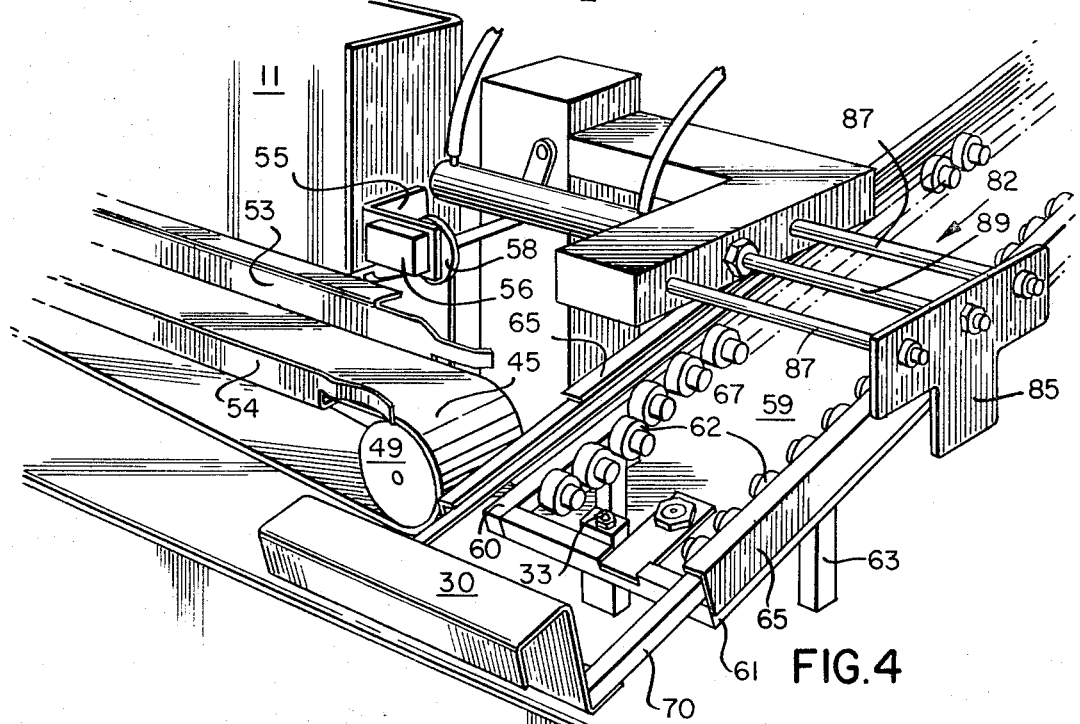
FIG. 4 is an illustration in perspective view of the input conveyor portion of the apparatus illustrated in FIG. 1.
Figure 5:
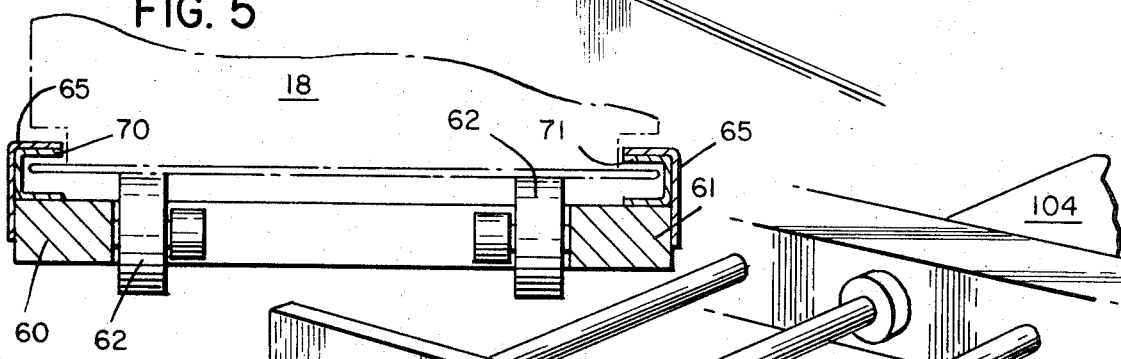
FIG. 5 is a cross sectional view of the conveyor of FIG. 4 taken along the line 5—5.
Figure 6:
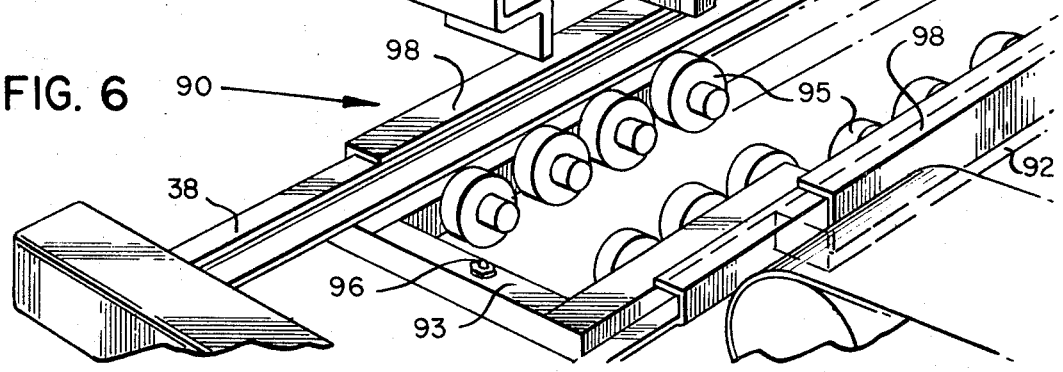
FIG. 6 is an illustration in perspective view of the output conveyor section of the apparatus illustrated in FIG. 1.

FIG. 3 is a perspective view of the drawer for storing the vial racks 18 prior to their being sampled and for supplying the racks in an orderly sequence to the belt conveyor. In FIG. 4 the drawer 30 is shown partially inserted onto the input conveyor 28. The input conveyor 28 is formed of a generally rectangular frame 59 having a pair of side members 60 and 61, each supporting a plurality of rollers 62 mounted for free rotation. The rollers may be formed of any convenient material, hard nylon being a suitable example. The frame members 60 are mounted on supports 63 such that the frame 59 lies in an inclined plane sloping downward toward the front, with the front most portion of the conveyor 28 being approximately on the same level as the belt 45 on belt conveyor 25. Mounted on the upper surface of side members 60 and extending along their length are a pair of generally L-shaped tracks 65 which are arranged to receive the side frame members 70 of the drawer 30. The front inside portion 64 of the member 60 is inset somwhat from the remainder of the frame to provide for better stability of a rack 18 as it moves laterally from the front most position on the input conveyor 28 onto the belt 45. A spring loaded indent button 33 mounted on frame 59 serves to retain a drawer 30 in place when it is into the conveyor 28.

The drawer 30 for containing the racks 18 is formed as a generally rectangular frame with two side channel members 70 and 71. A rear cross member 72 closes in one end of the frame, while an upstanding plate 74 forms the front of the drawer and includes a handle 75 for pushing the drawer in and out. The left side member 71 has a cut out portion 80 at the front of sufficient width to allow one of the racks 18 to be removed laterally from the drawer to this opening. The racks are stacked on the drawer with the base portion 20 of the racks sliding within the U-shaped side channels 70 and 71.

When, however, the drawer 30 is fully inserted into the input conveyor 28, the base members 20 of the racks 18 are supported on the individual rollers 62, rather than on the side channels 70 and 71 of the drawer. Accordingly, since the input conveyor is slanted toward the front, the racks 18 are gravity fed toward the front of the conveyor 28, being retained only by the front 74 of the input drawer 30. The input conveyor 25 includes underneath the front portion of the drawer of the conveyor, a pneumatic sensing element 81 which provides an output signal when a rack 18 is located immediately above it. The racks are removed from the conveyor 28 by the action of an air cylinder actuated pushing element 82 which consists of a bracket member 85 supported on side rails 87 above the conveyor 28 with the bracket in its preset position being located at the far side of the conveyor 28 and extending low enough so that, upon actuation of the air cylinder 89, the bracket 85 is drawn across the input conveyor 28 toward the belt conveyor 25 and pushes the rack 18 in the front most position out of the drawer 30 onto the belt conveyor 25. The signal from the pneumatic sensor 81 is used to trigger the action of the air cylinder 89 which actuates this pusher. Having completed its forward stroke the pushing element 85 is not immediately retracted to its preset position but remains in position at the left-hand side of the input conveyor 28 thereby preventing the next successive one of the racks 18 from rolling to the front most position in the drawer 30. The pusher element 85 is only retracted when the microswitch 56 signal indicates that the previous rack 18 has moved along conveyor belt 54.

THE OUTPUT CONVEYOR

The output conveyor 36 is positioned at the output end of the belt conveyor 25 and includes a generally rectangular frame 90 extending back from the end of the belt conveyor 25 in a direction generally normal to the direction of motion of the conveyor 25. The rectangular frame is formed of a pair of side pieces 91 and 92 jamed by cross pieces 93. Rollers 95 are rotatably mounted on the inner edges of both sides pieces 91 and 92 and, as in the input conveyor, these would usually be formed of a material such as hard nylon. As in the case of the input conveyor a spring loaded indent button 96 at the front of the conveyor frame 90 provides retention for the output drawer 38 when it is in position on the output conveyor 36. The output drawer 38 has substantially the same construction as the input drawer 30, with the exception that there is a cut out portion on the right-hand side rail of the output drawer corresponding to the cut out portion 80 which is on the left-hand side of the input drawer. Again the purpose of the cut out is to allow for the lateral insertion of a rack 18 through the cut out onto the drawer 38, when it is positioned on the output conveyor 36. The output conveyor 36 includes generally L-shaped side tracks 98 mounted on each of the members 91 and 92 and these tracks 98 are adapted to receive the side rails of drawer 38 in sliding relationship. When the drawer 38 is positioned on the output conveyor 36, however, any racks loaded into that drawer 38 are actually supported on the rollers 95 which extend slightly above the rails of the drawer when it is in position on this conveyor.

On the output conveyor 36 a pneumatic sensing element 100 is positioned above the conveyor and drawer 38 such that it will respond to the presence of a rack 18 loaded onto the front end of this drawer 38 from the belt conveyor 25. An air driven pushing element 102 is mounted on the front end of the conveyor 36 such that upon receipt of a signal from the sensing element 100 its air cylinder 104 drives this pushing element along the output conveyor 36 toward the rear thereof and a depending arm 106 of this pusher element 102 drives any rack 18 which is in the front portion of the drawer 38 toward the rear along the rollers 95 of the conveyor. This pushing element 102 is immediately reset to its outermost position in preparation for the receipt of the next rack. When the entire drawer 38 is filled with racks 18, the rack occupying the farthest back position actuates microswitch 40 providing an output signal stopping the conveyor until a new output load drawer 38 can be inserted. The depending arm 106 of the pusher element 102 is pivotally attached to the element 102 and may be rotated out of the way by rotation of knurled knob 110 in order to unload the output drawer 38.

SUMMARY OF OPERATION

In general, the operation of the conveyor and transport mechanism is such that an input drawer 30 may be partially or completely loaded with racks 18 which provide for orderly storage of the racks and for presentation of a number, typically 10, of racks loaded in magazine fashion to the input conveyor 28. However, the drawer 30 does not have means for feeding the racks to the belt conveyor 25 since it is arranged to cooperate with the structure of the conveyor 28 itself and hence the drawer 30 is of very simple construction not requiring close tolerances or the movable parts required for a conveyor. The same advantages and features are attendant upon the design of the output storage drawer 38. The drawers may be designed with cut outs on either side so that they would be interchangeable for use either as input conveyor drawers or output conveyor drawers. The design of the input conveyor 28 is such that it requires no separate drive to feed the drawers into a position where they may be loaded onto the belt conveyor and the only active portion of this conveyor is the push element 85. As will be apparent there is no need for synchronism of the actuating motion of the push element 85 with the conveyor belt drive 25. The only interaction between the two elements which needs to be controlled is that a new rack 18 not be pushed onto the conveyor belt 54 before a previous rack has been moved further along the conveyor and out of the immediate area where the next rack is to be loaded. This control is provided by the inhibiting signal from microswitch 56 preventing the resetting of the pusher element 85. Thus the input conveyor 28 provides for gravity feed of racks 18 into the frontmost position of the drawer 30, whence they are loaded by action of the pusher element 85 onto the belt conveyor, the lateral transport motion of the belt conveyor 25 being controlled basically by the sampling probe 12 action in sampling containers as they are aligned underneath this probe. Thus the belt 45 is generally running continuously until a container is located under the probe 12 and thereafter is running in increments to supply each successive container to the sampling position.

In similar fashion the output conveyor 36 is generally a passive element except for the reciprocating action of its pusher element 102. Once again this action does not need to be synchronized with the motion of the belt conveyor 25 since the arrival of a rack 18 at the front end of a positioned drawer 38 actuates the sensing element 100 resulting in the reciprocation of pusher element 102 which clears the front end of the drawer 38 for the next rack 18 discharged from the conveyor 25. Again when the drawer 38 is filled the action of the microswitch 40 stops the conveyor thereby preventing any jam up of racks at the output conveyor 36. When the conveyor belt 45 is stopped there can be no change in state of the microswitch 56 at the input conveyor loading point and accordingly there can be no jam up of racks 18 at that point either. The entire conveyor and transport assembly then provides for a compact, efficient conveyor comprising a very simple form of drawer or magazine and yet providing, without careful synchronization of drives, for a relatively long feed conveyor to the transport belt conveyor 25 and a relatively long storage conveyor at the output from the transport conveyor 25.

We claim:

1. A conveyor and transport apparatus for supplying a succession of racks, each containing a number of sample vials to an automatic sampler comprising,
   a transport conveyor,
   an input conveyor, positioned near one end of said transport conveyor,
   an output conveyor positioned near the opposite end of said transport conveyor,
   a first drawer for holding a plurality of said racks in ordered succession and adapted for insertion into a cooperative engagement with said input conveyor,
   a second drawer for receiving a succession of said racks from said transport conveyor after the sample vials have been sampled and adapted to be inserted into cooperative engagement with said output conveyor,
   said transport conveyor comprising, driven means for transporting said racks in a first direction from said input conveyor to a position adjacent said sampler and thereafter to said output conveyor,
   said input conveyor including non-driven conveying means for supporting said orderly succession of racks when the input drawer is inserted and for feeding each of the racks in succession towards that portion of said input drawer which is immediately adjacent said transport conveyor, said input conveyor further including load means having an actuated element for transferring each rack in that portion of the input drawer adjacent to the end of said transport means along a direction normal to the feed direction of said input conveyor and onto said transport conveyor,
   said output conveyor having one end positioned adjacent to the end of said transport conveyor opposite to said input conveyor, said output conveyor including non-driven conveyor means for supporting and conveying racks along the length of said output drawer,
   said output conveyor including an actuated drive element responsive to the delivery of one of said racks from said transport conveyor to drive said rack along said output conveyor towards the end of said output drawer removed from said transport conveyor.

2. A transport and conveyor system in accordance with claim 1 wherein said transport conveyor is a flexible belt driven by a motor operated under the control of said sampler and wherein said output conveyor includes sensing means for sensing when said output drawer has been filled with said racks, said sensing means providing an output signal which inhibits further motion of said transport conveyor until the output drawer has been removed from said output conveyor.

3. A transport and conveyor apparatus in accordance with claim 1 wherein said input conveyor comprises an elongated generally rectangular frame having a plurality of freely rotatable rollers mounted along the length thereof, said generally rectangular frame being inclined downwardly toward the end adjacent said transport conveyor to provide for gravity feed of racks along said conveyor.

4. Apparatus in accordance with claim 3 wherein said input drawer comprises a generally rectangular frame having side rails adapted to support said racks when said drawer is not inserted onto said input conveyor, the rails having dimensions such that when said drawer is inserted into position resting on said input conveyor, the racks within said drawer are supported upon said rollers, the drawer frame acting to limit motion of said racks in a direction normal to the feed direction of said conveyor and allowing freedom of motion in a direction along said conveyor.

5. A transport and conveyor apparatus in accordance with claim 4 wherein said drawer element is constructed to allow motion of said racks in the direction normal to said conveyor feed only in that position immediately adjacent to said transport conveyor and wherein said input conveyor actuated element includes a pusher element positioned to push racks from the position on said input conveyor adjacent to said transport conveyor onto said transport conveyor.

6. Apparatus in accordance with claim 5 wherein said pusher element is actuated by a pneumatic air cylinder, said air cylinder, when actuated, driving said pusher element from an initial position at one side of said input conveyor to a position at the opposite side of said input conveyor adjacent to said transport conveyor, said pusher element remaining in said position adjacent to said transport conveyor, where it restrains the feed of the next rack in succession to that position of said input conveyor adjacent to said transport conveyor, until it receives a reset signal, the transport conveyor including a sensing means positioned adjacent the input end thereof and providing a reset signal to said output conveyor pusher element only when no rack is in position at the input end of said transport conveyor.

7. A conveyor and transport apparatus in accordance with claim 1 wherein said output conveyor comprises an elongated generally rectangular frame formed by a pair of side members and a plurality of cross members, a plurality of freely rotating rollers mounted on each of said side members along the length thereof, said generally rectangular frame being disposed in a direction normal to the direction of travel of said transport conveyor, a sensing element positioned at the end of said output conveyor opposite the end adjacent to said transport conveyor, said sensing element providing an output signal when one of said racks reaches the end of said drawer adjacent to it, said output signal being operative to inhibit any further motion of said transport conveyor.

* * * * *